United States Patent [19]

Hetherington, Jr. et al.

[11] Patent Number: 4,595,831

[45] Date of Patent: Jun. 17, 1986

[54] MULTIPLE MASS RANGE TRIPLE COLLECTOR SPECTROMETER

[75] Inventors: Ernest A. Hetherington, Jr., Duncanville; Cecil M. Orr, Dallas, both of Tex.

[73] Assignee: Mobil Oil Corporation, New York, N.Y.

[21] Appl. No.: 549,852

[22] Filed: Nov. 9, 1983

[51] Int. Cl.[4] .............................................. B01D 59/44

[52] U.S. Cl. .................................. 250/281; 250/505.1

[58] Field of Search ...................... 250/251.1, 281, 283, 250/284, 288, 505.1

[56] References Cited

U.S. PATENT DOCUMENTS 3,786,249 1/1974 Anbar et al. ........................ 250/283

4,031,397 6/1977 Cardillo ............................. 250/281

OTHER PUBLICATIONS

"Natural Radiogenic Isotopes: Tracers of Geological Processes", A. W. Hofman, Max-Planck Institut fur Chemie, 6500 Mainz, F.R. Germany, SPECTRA, vol. 8, No. 4, Dec. 1982, pp. 14-19.

"Multicollection In Thermal Ionisation Mass Spectrometry", Patrick J. Turner, VG Isotopes Limited, Winford, Cheshire, CW7 3BX, England.

Publication No. 02.481, JC Jan. 1982, Newsletter from VG Isotopes Limited.

*Primary Examiner*—Bruce C. Anderson

*Attorney, Agent, or Firm*—Alexander J. McKillop; Michael G. Gilman; Charles J. Speciale

[57] ABSTRACT

The mass spectrometer has multiple collectors for measuring the intensity of ion beams and a resolving plate having a plurality of aperture clusters. The plate is rotated to selectively position one of the aperture clusters between the beams and the collectors. The apertures in each cluster have separations which allow beams of predetermined ion mass to impinge upon the collectors.

8 Claims, 8 Drawing Figures

MULTIPLE MASS RANGE TRIPLE COLLECTOR SPECTROMETER

BACKGROUND OF THE INVENTION

This invention relates to mass spectrometers and more particularly to a mass spectrometer which has multiple collectors for simultaneously measuring the intensity of beams of ions of different mass.

Multiple collectors in mass spectrometers permit the simultaneous measurement of multiple ion beams. They have the advantage of collecting a greater proportion of the total available ion current during a given period of time with improved precision and reduced analyses times. The effects of fluctuations of ion beams with respect to time are reduced and other variables such as amplifier decay constant effects are eliminated.

Multiple collector mass spectrometers are particularly useful in geochronology wherein the intensity of certain radiogenic isotopes is measured and normalized on the assumption that certain ratios are constant. This technique is described in NATURAL RADIOGENIC ISOTOPES: TRACES OF GEOLOGICAL PROCESSES, A. W. Hofman Max-Planck-Institut fur Chemie 6500 Mainz, F.R. Germany, SPECTRA, Vol. 8, No. 4.

Typically, the isotopes of strontium are measured. However, the measurement of other isotopes is desirable. Because these isotopes have different mass, the positioning of the collector plates is changed to measure different isotope ratios. State of the art mass spectrometers have collectors with adjustable separations. Such mass spectrometers are described in MULTICOLLECTION IN THERMAL IONISATION MASS SPECTROMETRY by Patrick J. Turner, VG Isotopes Limited, Winford, Cheshire CW7 3BX, England and in publication 02.481 JC January 1982, a Newsletter from VG Isotopes Limited.

It is an object of the present invention to improve the resolving accuracy and speed of measurement of mass spectrometers which have multiple collectors.

SUMMARY OF THE INVENTION

In accordance with the present invention a mass spectrometer has a resolving plate having a plurality of aperture clusters which are selectively positioned between the ion beams and the fixed collectors. The apertures in each cluster have separations which allow beams of predetermined ion mass to impinge upon the collectors.

The resolving plate is rotatable on a shaft to selectively position one of the aperture clusters between the ion beams and the collectors. The collectors are rectangular Faraday cups and the apertures are slits which are positioned over the cups. A central slit in each cluster is at the same radial distance from the rotatable shaft so that as the disk is rotated the central slit in each cluster is aligned with a narrow central Faraday cup. Faraday cups on either side of the central one have a wider width to accommodate alignment with slits on both sides of the central slit and at different radial distances from the rotatable shaft.

In this manner, the resolving plate accurately selects ion beams according to mass. At the same time the resolving slits can be quickly changed to measure different isotope ratios.

In accordance with an improved modification of the invention the collectors are positioned at different distances from the source to accommodate different focal points of the beams of ions and the clusters of apertures on the resolving plate are on circumferential segments which are at different distances from the source of ions to accommodate different focal points of the beams.

The foregoing objects, features and advantages of the invention will be better understood from the following more detailed description and appended claims.

SHORT DESCRIPTION OF THE DRAWINGS

DESCRIPTION OF THE PREFERRED EMBODIMENT

Figure 1:
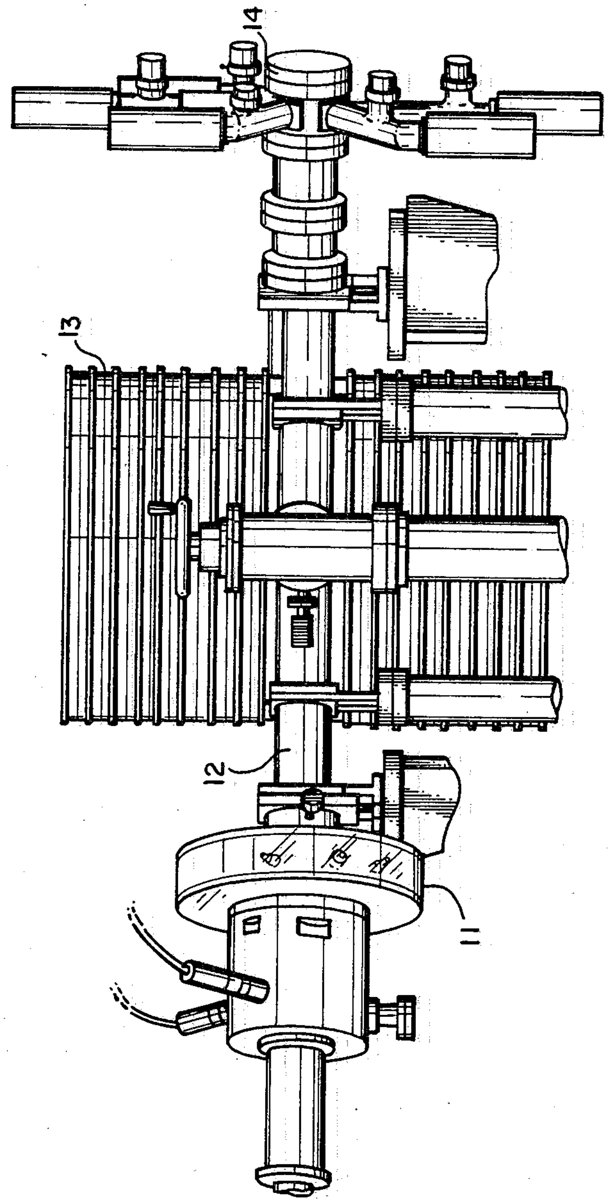
FIG. 1 shows the mass spectrometer of the present invention.

Referring to FIG. 1 the mass spectrometer includes a source of ions emanating from a sample which is placed on one of the multiple filaments which are in the turret 11. Ions emanating from the filament are accelerated in the housing 12 which passes through the magnetic coil housing 13. The magnetic field created by these coils turns the ion beams with the radius of curvature being different for different mass ions. As a result, when the ion beams reach the collector 14, the beams are separated according to mass.

Figure 2:
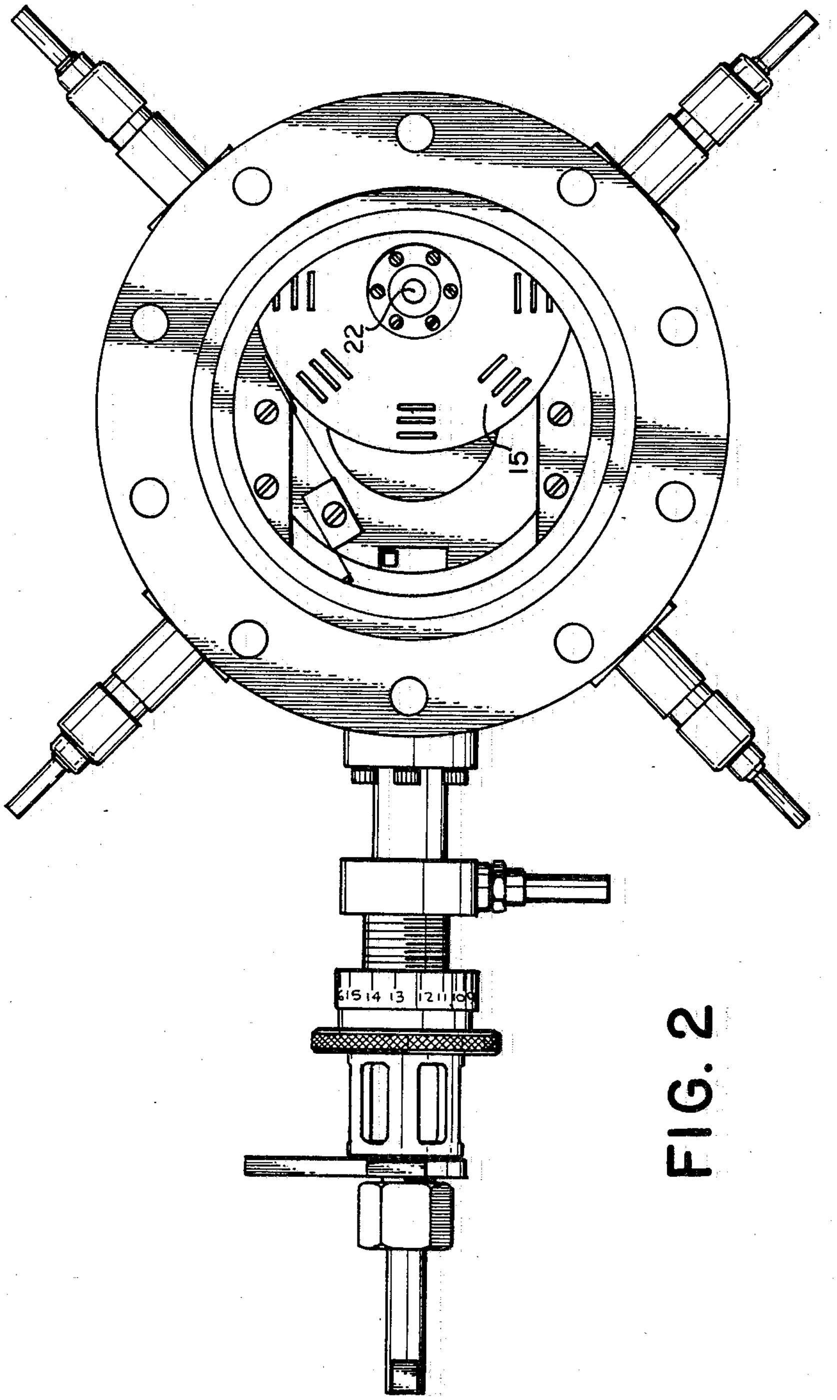
FIG. 2 shows the collector assembly in a view looking toward the resolving plate.
Figure 3:
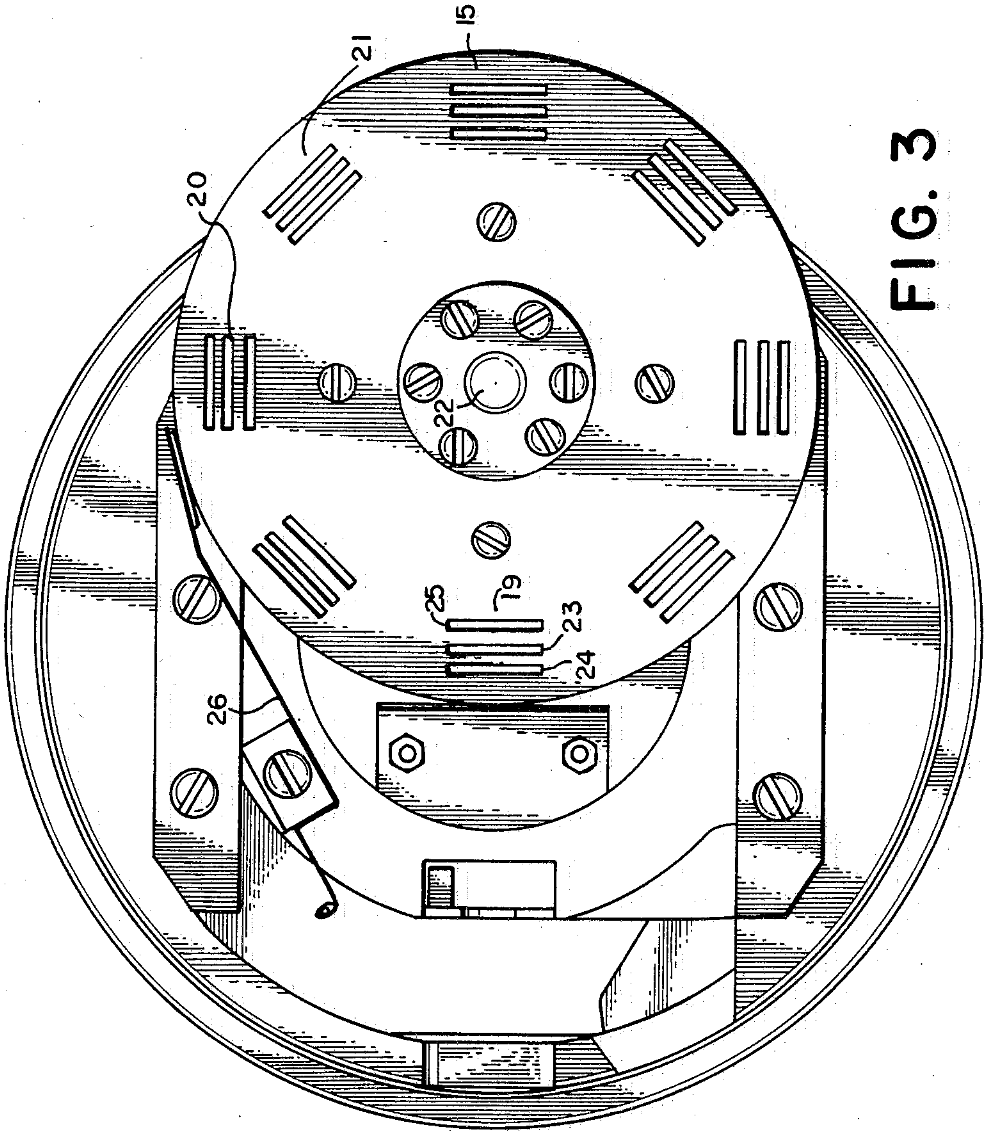
FIG. 3 shows the resolving plate and assembly removed from its housing.
Figure 4:
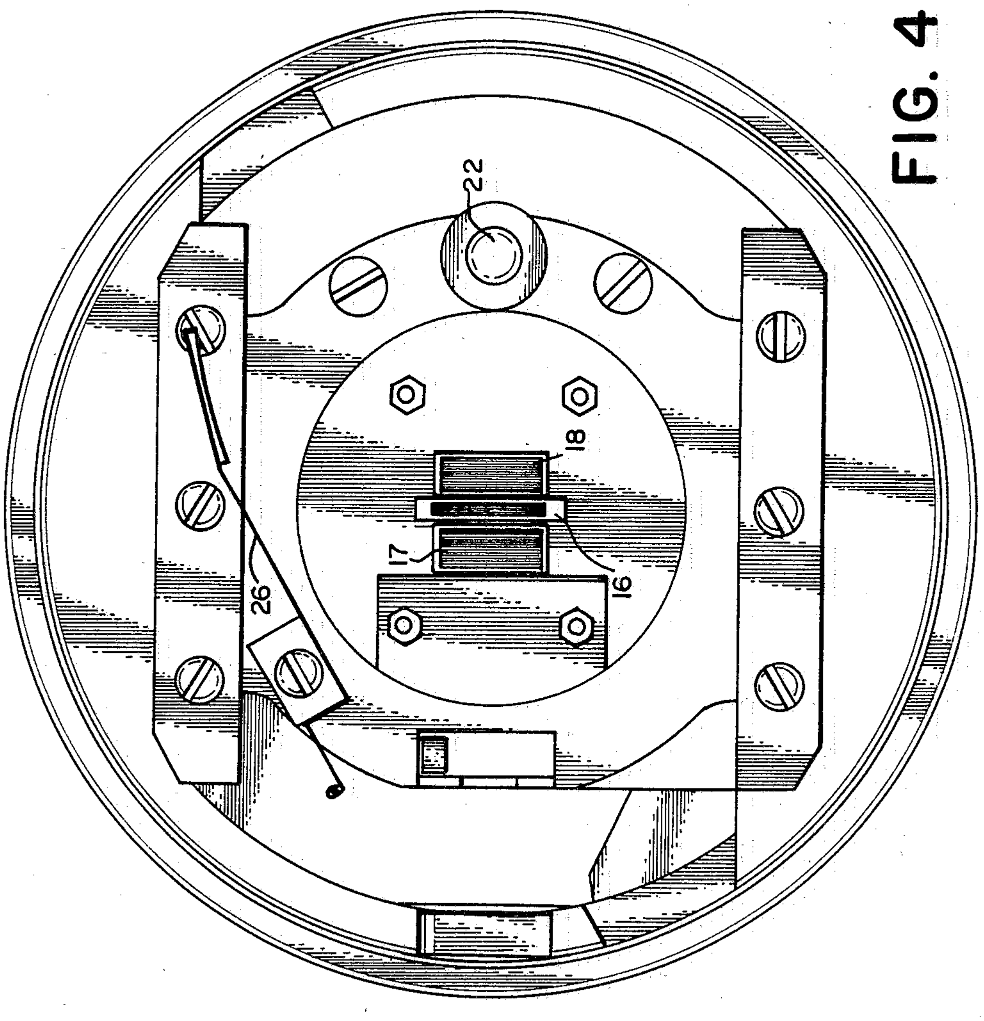
FIG. 4 is a view of the collector assembly which shows the Faraday cups.
Figure 5:
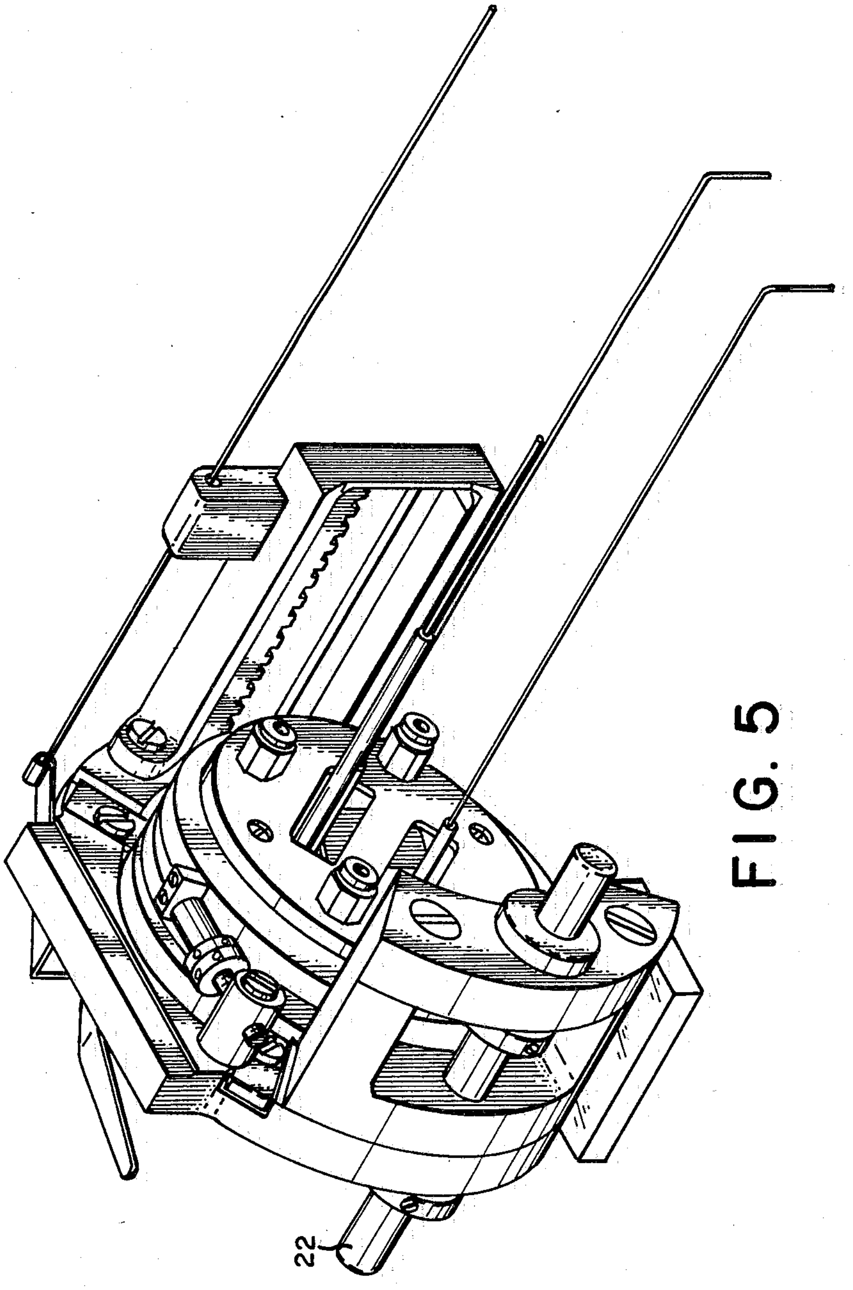
FIG. 5 is a view of the collector assembly from the rear.
Figure 6:
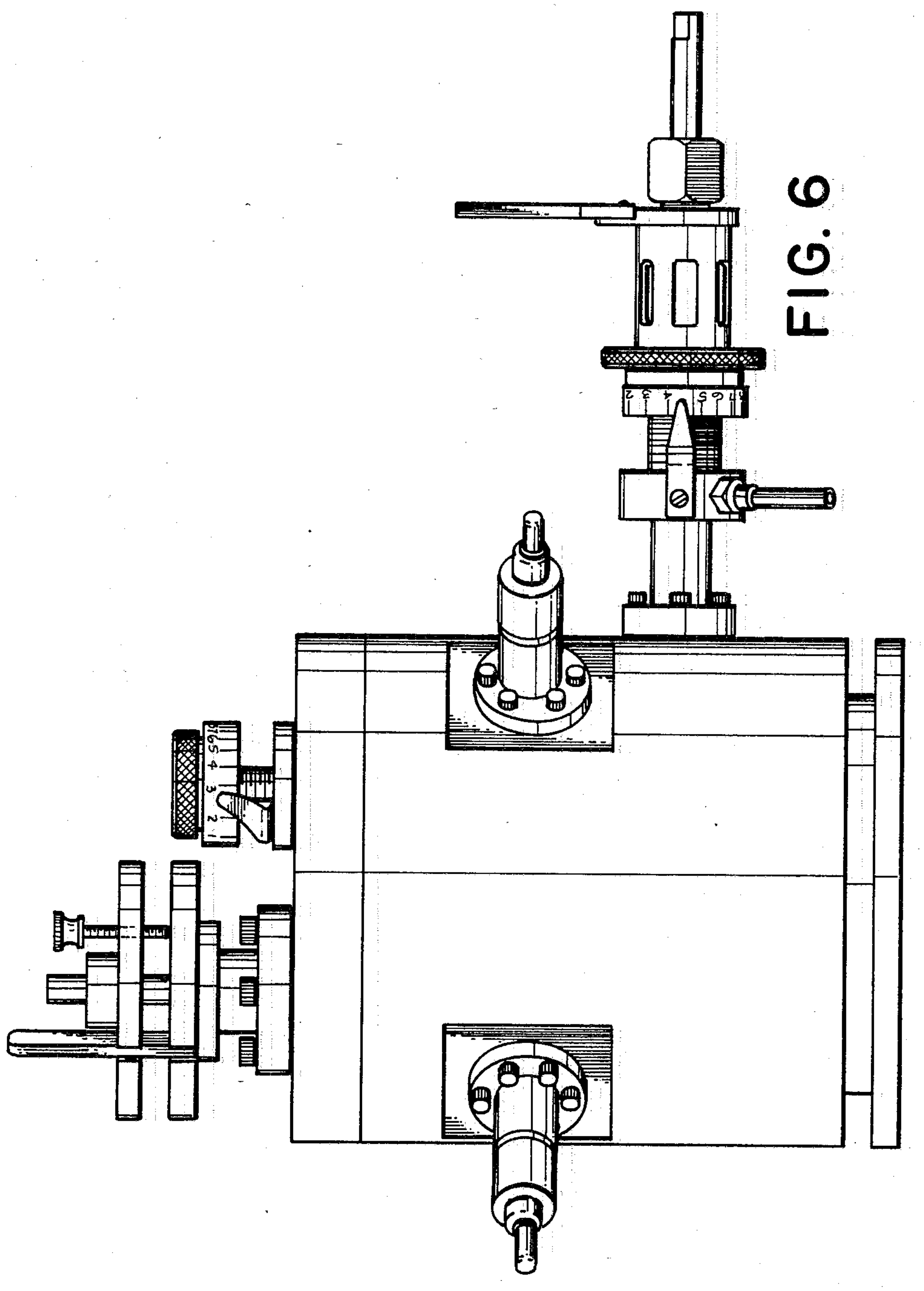
FIG. 6 is a view of the collector assembly in its housing.

In accordance with the present invention, a resolving plate 15, shown in FIGS. 2 and 3, is positioned between the ion beams and the collectors, which are shown in FIG. 4. The collectors include a narrow width central Faraday cup 16 and Faraday cups 17 and 18 of wider width on both sides of the central cup.

Resolving plate 15 has a plurality of aperture clusters 19, 20, 21, and others. In the example shown, there are eight different aperture clusters for measuring eight different isotope ratios. The resolving plate 15 rotates on shaft 22 to selectively position one of the aperture clusters between the ion beams and the collectors.

Referring particularly to the cluster 19, it includes a central slit 23 which can be positioned over the narrow width central Faraday cup 16. Slits 24 and 25 are at determined distances from the central slit and they are selectively positioned over the cups 17 and 18 of wider width. The wide width of the cups 17 and 18 accommodates different separation distances between the central slit 23 and the other slits 24 and 25. These different distances resolve the ion beams according to mass. The central slits of all clusters are at the same radial distance about shaft 22. The other slits are at different radial distances about the shaft 22. In this manner a single set of fixed Faraday cups 16–18 can be used to measure the intensity of ion beams emanating from different isotopes.

A suppressor plate (not shown) is positioned between the resolving plate and the collectors. It is electrically isolated from the resolving plate 15 and the collectors 16–18. A sliding contact 26 applies the proper electrical potential to the secondary plate. The suppressor plate is similar in configuration to the resolving plate 15 and is also mounted on the shaft 22. The suppressor plate suppresses secondary electrons emitted from the Faraday cups.

Figure 7:
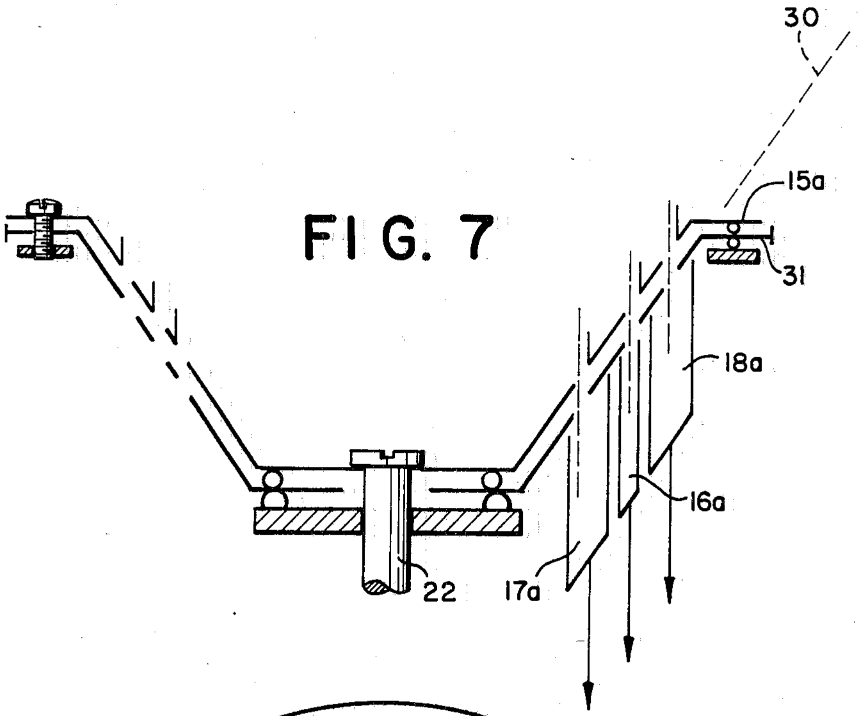
FIGS. 7 and 8 show a modified resolving plate and collector.
Figure 8:
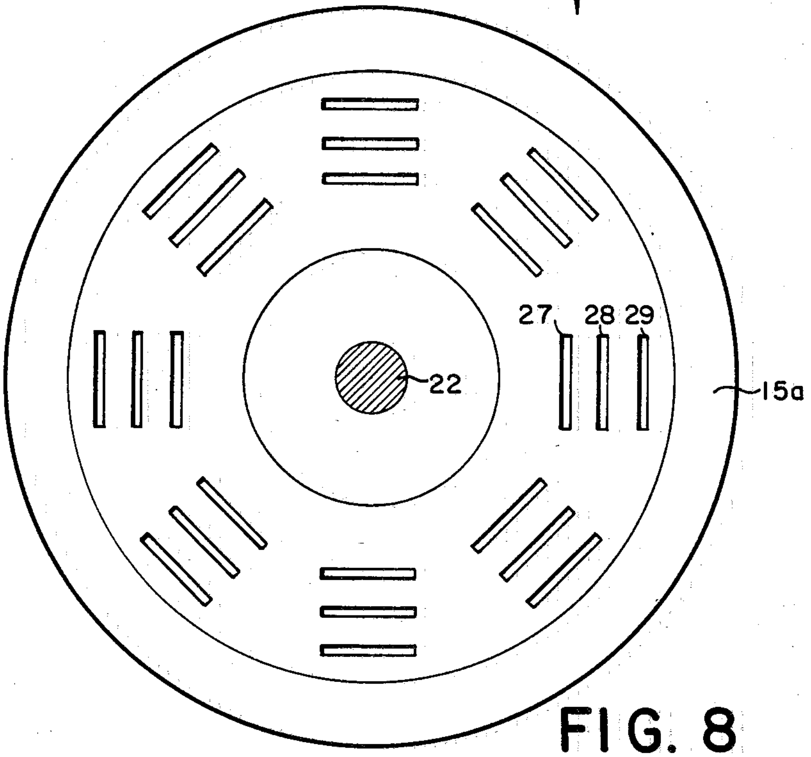

A modification of the invention is shown in FIGS. 7 and 8. In this modification the Faraday cups 16a, 17a and 18a are at different distances from the source of ions. For some isotopes, the focal plane is significantly different. The cups 16a, 17a and 18a are in the focal planes of these beams. The resolving plate 15a has circumferential segments 27, 28 and 29 which are at different distances from the source of ions. The different apertures of each cluster are in different circumferential segments so that the apertures are in the focal plane of each of the different ion beams.

While particular embodiments of the invention are shown and described, various modifications are within the spirit and scope of the invention. The appended claims are, therefore, intended to cover all such modifications.

What is claimed is:

1. A mass spectrometer comprising:

a source of ions emanating from a sample;

means for separating beams of said ions according to mass;

multiple collectors for measuring the intensity of said beams;

a resolving plate having a plurality of aperture clusters, the clusters having apertures with different separations which allow beams of different predetermined ion mass to pass through to impinge upon said collectors; and a shaft, said resolving plate being rotatable on said shaft to selectively position one of said aperture clusters between said beams and said collectors with each aperture in the cluster corresponding with one of said collectors.

2. The mass spectrometer recited in claim 1 wherein the apertures in each cluster on said resolving plate are at different distances from said source to accommodate different focal points of said beams on ions.

3. The mass spectrometer recited in claim 2 wherein said resolving plate is a rotatable disk having circumferential segments which are at different distances from said source of ions, the different apertures of each cluster being in different circumferential segments to accommodate different focal points of said beams of ions.

4. A mass spectrometer comprising:

a source of ions emanating from a sample;

means for separating beams of ions according to mass;

multiple Faraday collectors for measuring the intensity of said beams;

a resolving plate having a plurality of aperture clusters, each cluster having slits with different separations which allow beams of predetermined ion mass to pass through to impinge upon said collectors; and means for changing the relative positions between said resolving plate and said collectors to selectively position one of said aperture clusters between said beams and said collectors with each aperture in the cluster corresponding with one of said collectors.

5. The mass spectrometer recited in claim 4 wherein said Faraday collectors comprise:

a narrow width central Faraday cup and Faraday cups of wider width on both sides of said central cup.

6. The mass spectrometer recited in claim 5 wherein each cluster includes:

at least a central slit which is selectively positioned over said narrow width central Faraday cups; and slits at predetermined distances from said central slit and selectively positioned over said cups of wider width wherein said wider width accommodates said different distances.

7. The mass spectrometer recited in claim 6 wherein said resolving plate has a central shaft on which it is rotatable to selectively position said clusters over said collectors, said central slits being at the same radial distance about said shaft and the other slits being at different radial distances about said shaft.

8. The mass spectrometer recited in claim 1 or claim 4 wherein said collectors are at different distances from said source to accommodate different focal points of said beams of ions.

* * * * *